(12) United States Patent
Mongardien et al.

(10) Patent No.: US 7,064,887 B2
(45) Date of Patent: Jun. 20, 2006

(54) RAMAN AMPLIFIER WITH GAIN CONTROL

(75) Inventors: Dominique Annie Mongardien, Antony (FR); Dominique Bayart, Clamart (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/952,882

(22) Filed: Sep. 30, 2004

(65) Prior Publication Data
US 2005/0094254 A1    May 5, 2005

(30) Foreign Application Priority Data
Oct. 30, 2003    (EP) .................................. 03292706

(51) Int. Cl.
*H01S 3/00*    (2006.01)
(52) U.S. Cl. ..................................... 359/334
(58) Field of Classification Search ................ 359/334, 359/337.4, 341, 41
See application file for complete search history.

(56) References Cited

U.S. PATENT DOCUMENTS

| | | |
|---|---|---|
| 6,384,962 B1 | 5/2002 | Foursa et al. |
| 6,441,950 B1 | 8/2002 | Chen et al. |
| 6,456,425 B1 | 9/2002 | Foursa et al. |
| 6,519,082 B1 | 2/2003 | Ghera et al. |
| 6,542,287 B1 | 4/2003 | Ye et al. |
| 6,741,389 B1 * | 5/2004 | Kumasako et al. ......... 359/334 |

FOREIGN PATENT DOCUMENTS

| | | |
|---|---|---|
| EP | 1 018 666 A1 | 7/2000 |
| GB | 2 383 209 A | 6/2003 |
| WO | WO 00/49721 A2 | 8/2000 |

OTHER PUBLICATIONS

Motoshima K et al: "A Channel-Number Insensitive Erbium-Doped Fiber Amplifier With Automatic Gain and Power Regulation Function," Journal of Lightwave Technology, IEEE. New York, US, vol. 19, No. 11, Nov. 2001, pp. 1759-1761, XP001114842.

* cited by examiner

*Primary Examiner*—Mark Hellner
(74) *Attorney, Agent, or Firm*—Sughrue Mion, PLLC

(57) ABSTRACT

A two-stage Raman amplifier provides a gain control compensating for span loss variations and changing channel loading. A first amplifier stage (S1) has a first amplifying medium (F1) and a first pump light source (P1, P2, Pn), which is controlled and adjusted by a control unit (CU) to compensate for span loss variations. A second amplifier stage (S2) has a second amplifying medium (F2) and a second pump light source (P'1, P'2, P'n), which is controlled and adjusted by the control unit (CU) to balance changing channel loading.

11 Claims, 3 Drawing Sheets

RAMAN AMPLIFIER WITH GAIN CONTROL

The invention is based on a priority application EP 03292706.3 which is hereby incorporated by reference.

BACKGROUND OF THE INVENTION

The invention relates to the field of optical fiber communication systems and more particularly to a lumped Raman amplifier with gain control and a method of controlling the gain of a Roman amplifier.

In optical fiber communication systems, optical signals propagating along an optical fiber undergo signal attenuation due to absorption and scattering in optical fibers. Therefore, optical signals require periodic amplification over long distances, which can be performed either by electrical repeaters or by optical amplifiers. Known optical amplifier types include Erbium-doped fiber amplifiers (EDFAs), semiconductor optical amplifiers (SOAs) and Raman amplifiers. Due to their flat gain over a wide signal wavelength band, Raman amplifiers have gained increasing attention in the recent past as ideal amplifier candidate for use in wavelength division multiplex (WDM) transmission systems.

The Raman amplification process is based on the Raman effect, which is a non-linear optical process that only occurs at high optical intensities and involves coupling of light propagating through the non-linear medium to vibrational modes of the medium, and re-radiation of the light at a different wavelength. Re-radiated light upshifted in wavelength is commonly referred to as a Stokes line, whereas light downshifted in wavelength is referred to as an Anti-Stokes line. The Raman effect is described by quantum mechanics as scattering of photons at molecules which thereby undergo a transition of their vibrational state. Raman amplification involves stimulated Raman scattering, where the incident beam, having a higher optical frequency, often referred to as the pump beam, is used to amplify the lower frequency beam often referred to as the Stokes beam or the signal beam through the Raman effect.

It is particularly important for all types of optical amplifiers to have a flat gain curve over the entire spectral band of the data signal to be amplified. Moreover, the gain must remain stable over time, which may be particularly difficult when the number of wavelengths in the data signal (i.e., the "channel loading") changes. Known EDFAs have therefore an optical filter which is adapted to flatten the gain spectrum of the amplifier. Some EDFAs have additionally a variable optical attenuator (VOA), which is tuned when the input power varies to keep the gain flatness. Moreover, the optical pump power of EDFAs is increased with the number of signal wavelengths (or channels). Such a gain control function is however not known for lumped Raman fiber amplifiers (LRFAs).

U.S. Pat. No. 6,384,962 describes a method and apparatus for automatic gain equalization using Raman amplifiers. The apparatus contains a first and a second Raman amplifier, having first and second gain curves, respectively. The amplifiers are chosen such that the gain curve of the first amplifier has maxima where the gain curve of the second amplifier has minima and vice versa to achieve total gain curve which is substantially flatter than the first or second alone.

U.S. Pat. No. 6,456,425 describes a method and apparatus to perform lumped Raman amplification. In order to increase the total bandwidth of a multi-pump Raman amplifier, the optical signal is split into a plurality of signal parts. Each part is amplified using a separate Raman amplifier. Each amplified part is then combined into a single amplified optical signal.

U.S. Pat. No. 6,519,082 discloses a method of dynamically monitoring the on-off gain of a Raman amplifier using a probe signals outside the spectral range of the data signal. However, such off-band measurement cannot predict the gain characteristic within the spectral band accurately.

It is an object of the present invention to provide a method and related apparatus for controlling the gain of a Raman amplifier to compensate for span loss variations and changing channel loading.

SUMMARY OF THE INVENTION

These and other objects that appear below are achieved by a two-stage Raman amplifier. A first amplifier stage has a first amplifying medium and a first pump light source, which is controlled to compensate for span loss variations. A second amplifier stage has a second amplifying medium and a second pump light source, which is tuned to balance changing channel loading.

In particular, the optical amplifier has a first amplifier stage and a second amplifier stage, which is optically connected in series with the first amplifier stage. The first amplifier stage has a first gain medium and a first pump light source coupled to the first gain medium to launch a pump light signal therein for amplifying the input optical signal by stimulated Raman scattering. The second amplifier stage has a second gain medium and a second pump light source coupled to the second gain medium to launch a pump light signal therein for amplifying the optical signal traversing the second medium by stimulated Raman scattering. A control unit monitors the optical signal and adjusts a pump power of the first pump light source to varying input signal attenuation and adjusts a pump power of the second pump light source to a changing number of wavelength channels in the optical signal.

The invention has various advantages over the art. No expensive optical filters and no VOAs are required to flatten the gain spectrum. As opposed to known EDFAs, which require filling channels when only a few signal channels are used, this is no longer the case for the present invention. Moreover, the invention allows an adjustment of the amplifier when the number of signal channels and the span loss are varying while maintaining similar output power and noise figure values for each signal channel. Furthermore, the gain shape remains fairly unchanged during the system lifetime or through different span losses.

BRIEF DESCRIPTION OF THE DRAWINGS

A preferred embodiment of the present invention will now be described with reference to the accompanying drawings in which.

DETAILED DESCRIPTION OF THE INVENTION

Figure 1:
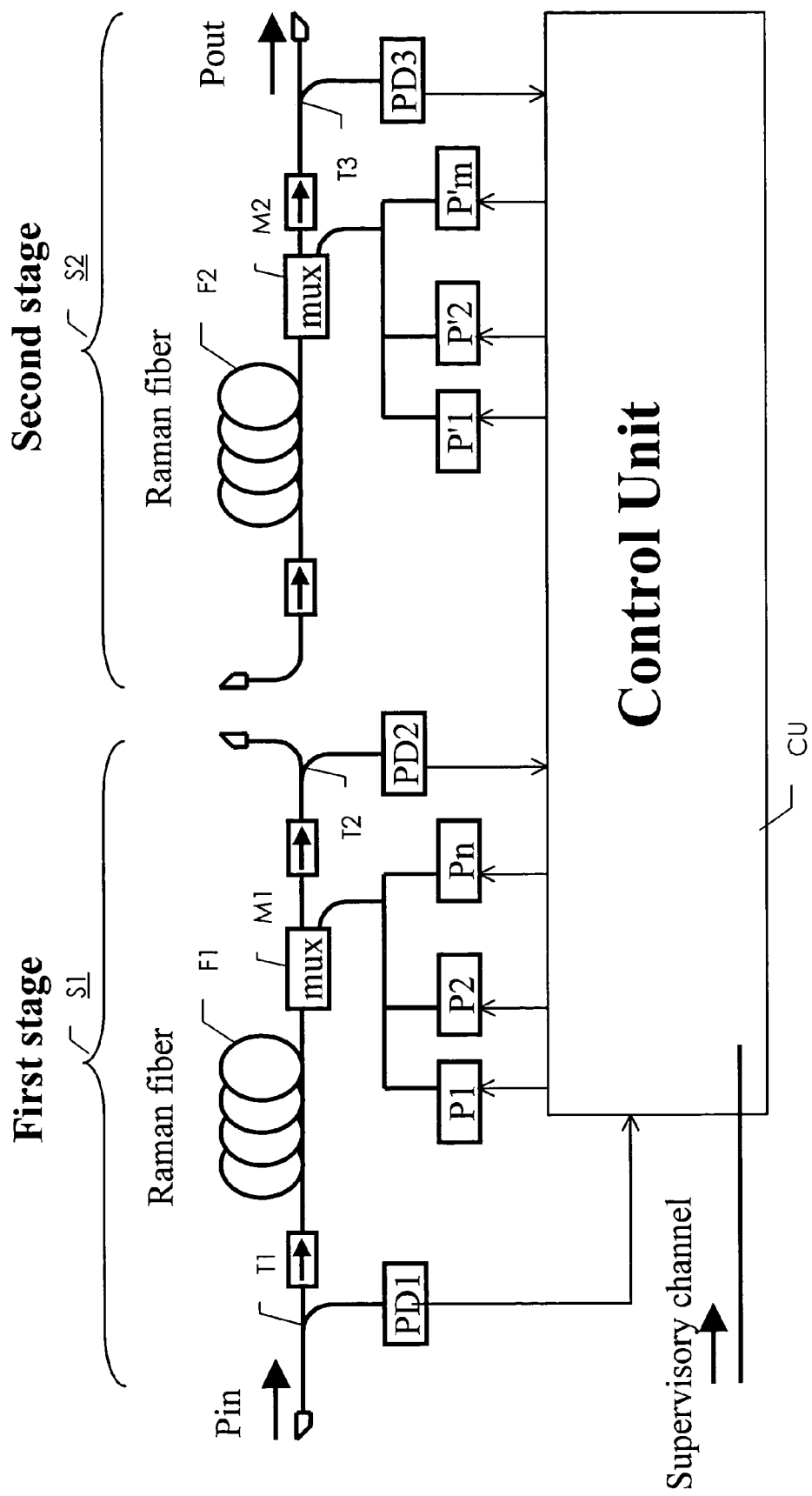
FIG. 1 shows a lumped Raman amplifier according to the invention.

The design of a lumped Raman fiber amplifier (LRFA) according to the invention is shown in FIG. 1. It has two amplifier stages S1 and S2. Each stage contains a length of fiber F1 and F2, respectively, with high Raman efficiency which is pumped by a set of pump sources P1, P2, Pn and P'1, P'2 and P'n, respectively. The pump sources P1, P2, Pn and P'1, P'2 and P'n are emitting at $\lambda 1$, $\lambda 2$, $\lambda n$ and $\lambda' 1$, $\lambda' 2$ and $\lambda' n$ wavelengths, respectively. In the preferred embodiment, n=3, i.e., three wavelengths are used. A data signal Pin is connected to the input of the first amplifier stage S1. The output of stage S1 (shown as a connector) is connected to the input of the second stage (not shown). A Dispersion Compensating Module (DCM) can preferably be connected between the output of stage S1 and the input of stage S2 (not shown). Such a DCM is in the following thus termed the interstage. A DCM is typically used to compensate for chromatic dispersion of the link fiber. Insertion loss of the DCM can be compensated by the amplifier gain.

Pump wavelengths $\lambda 1$, $\lambda 2$, and $\lambda n$ are generated by corresponding laser sources P1, P2, Pn and coupled via a wavelength multiplexer M1 in reverse direction into fiber F1. Equally, pump wavelengths $\lambda' 1$, $\lambda' 2$ and $\lambda' n$ of the second stage S2 are generated by corresponding laser sources P'1, P'2, and P'n and coupled via a wavelength multiplexer M2 in reverse direction into fiber F2. A control unit CU controls the pump power of all pumps. Laser diodes ay be used to generate the pump wavelengths but the pump wavelengths can also be generated by one or a set of multi-wavelength lasers such as multi-wavelength Raman lasers, for instance.

The length of Raman fiber can be different for the two stages, the number and the value of the pump wavelengths can be the same. The pump wavelengths used in the preferred embodiment are 1427 nm, 1437 nm, 1465 nm, respectively (the pump wavelengths are around 100 nm lower than the amplified signal wavelengths). The fibers are counter-pumped as shown in the figure, but could equally be co-pumped or both. Pump wavelengths and powers are chosen so as to achieve flat signal gain over the signal bandwidth. The signal gain has in the preferred embodiment less than 1 dB gain variation over the entire C-band, for instance. A tap coupler T1 and a photodiode PD1 are used at the input of the amplifier to measure the input signal power. Additional tap couplers T2 and T3 and corresponding photodiodes PD2 and PD3 can optionally be used at the output of the first stage S1 and at the output of the amplifier to measure the first stage output power and the total amplifier output power.

The operating point of the LRFA is defined by the span loss preceding the amplifier and the number of signal channels. The initial span loss depends on parameters such as the link fiber length. For a given number of signal channels and a given span loss, the total signal input power is Pin and the required output power is Pout. The pump powers, for the first and second stages, are tuned to achieve the gain values G1 and G2, with $G=G1*G2=Pout/Pin$. According to the invention, the gain G1 is generally chosen to achieve a good noise figure of the LRFA, which means that a high gain value is required, and to limit the signal power at the output of the first stage so as to prevent non-linear effects in the interstage. A typical value for maximum signal power is −7 dBm/channel at the input of the interstage. The gain G2 is defined by the available signal power at the input of the second stage and the required signal power at the output of the LRFA. A typical value is 1 dBm/channel at the output of the amplifier.

A supervisory channel provides information to the control unit: the number of operating signal channels. For an increased or decreased number of signal channels at the input of the LRFA, the total input signal power increases or decreases, respectively. According to the present invention, only the pump powers of the second stage S2 are tuned to increase or decrease the total output signal power of the LRFA, while the pump powers of the first stage S1 remain unchanged. Accordingly, the already existing channels will keep their previous gain and noise figure values, and the added channels will have similar gain and noise figure values as the first channels, while keeping a moderate channel power at the input of the interstage. The total signal power at the output of the amplifier is measured by PD3: it could be used to check that the maximum output amplifier power is not exceeded.

During the lifetime of the system or upon the system span table, the span loss may vary, due to passive components losses increase, link fiber loss increase and added splices, for instance. In this case, the signal power at the input of the LRFA is modified as measured with the input tap coupler T1 and photodiode PD1. According to the invention, the pump powers of the first stage are tuned to increase the gain of the first stage so as to maintain similar signal channel power at the output of the first stage S1. The pump powers of the second stage S2 remain unchanged. The tap coupler T2 and photodiode PD2 provide a measurement of the total signal power at the output of the first stage with the new pump powers. It is used by the control unit CU to verify that the pump powers are adjusted correctly.

Using the information provided by the photodiode PD1 linked to the input tap coupler T1 and by the supervisory channel, the control unit calculates the required pump power values for the first stage (used to balance span loss variation) and for the second stage (used to compensate for a change in the number of signal channels).

Figure 2:
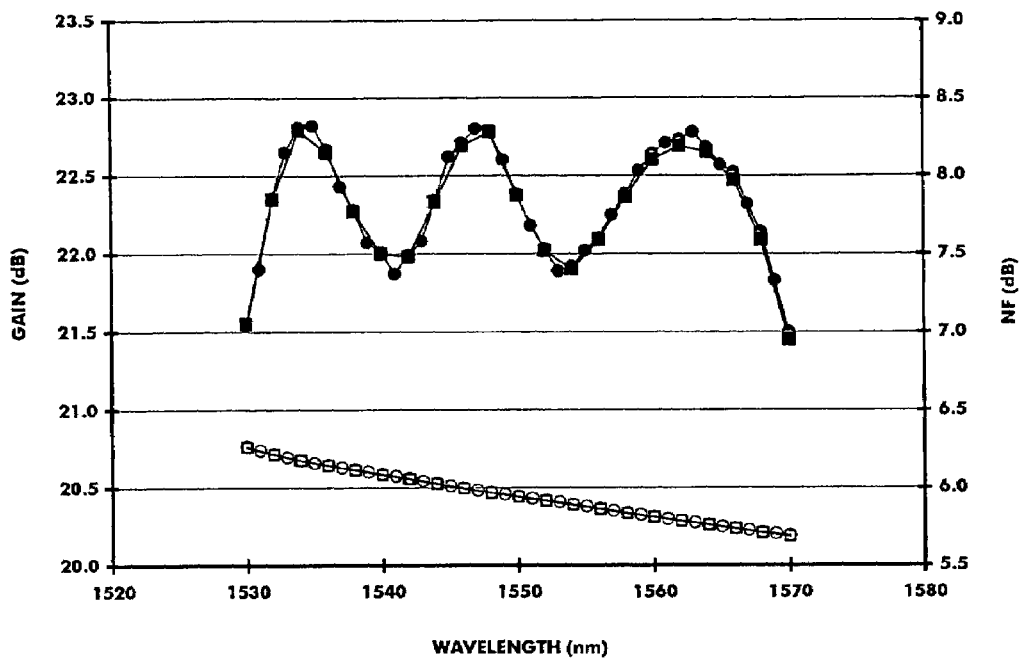
FIG. 2 shows in a diagram the gain spectrum of the amplifier for different channel loadings.

In FIG. 2, a diagram shows the signal gain over the signal bandwidth for 1 and for 40 input channels. For a given span loss, the diagram shows the gain in dB (left hand scale) of each signal channel when one single signal channel (squares) or 40 signal channels (circles) are injected into the amplifier and after the second stage pump powers have been adjusted. As can be observed from the diagram, the gain of a given channel fluctuates less than 0.1 dB by adding 39 channels. Open squares and open circles are used for the noise figure values (right hand scale), no variation can be seen from 1 to 40 channels loading, showing that gain depletion is not significant in the first amplifier stage.

Figure 3:
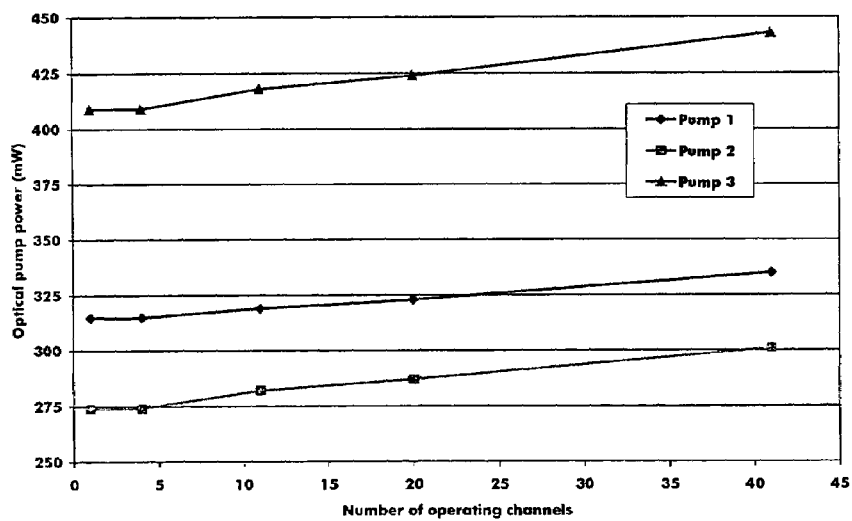
FIG. 3 shows in a second diagram the optical pump power of the three pump wavelengths of the pumps in the second amplifier stage as a function of the number of channels.

FIG. 3 shows the pump powers required for the three pump wavelengths in the second stage in mW for 1 to 40 channels. For a small number of channels (1 to 5 channels), the pump powers are not changed significantly. When the number of operating channels increases the pump powers are increased (quite linearly) with the channel count. Nevertheless, the pump powers increase is modest, namely less than 10% for 5 to 40 channels loading. The required pump powers for the second stage depend mainly on the number of input signal channels and not on the signal channel wavelength values.

Figure 4:
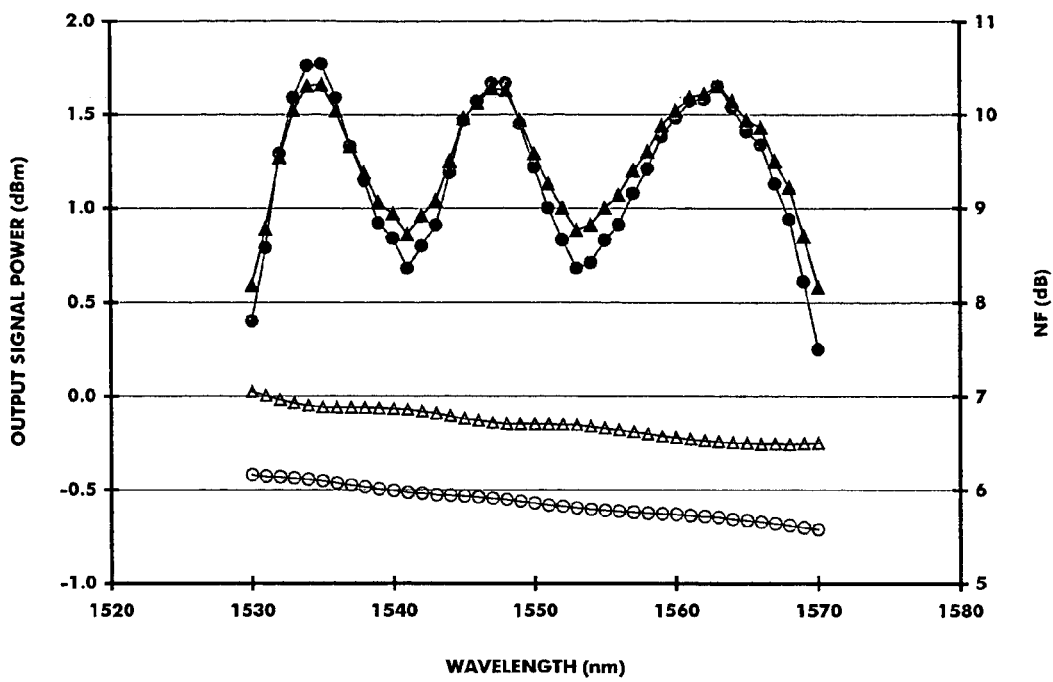
FIG. 4 shows in a third diagram the output power spectrum of the amplifier for different span losses.

For a 40 channels multiplex at the input of the LRFA, FIG. 4 shows the output power (left hand scale) of the LFRA when the span loss increases from 16 dB (triangles) to 25 dB (circles) and the pump powers of the first stage are adjusted. The output power of a given channel variation is less than 0.2 dB for 9 dB variation of the span loss. The noise figure (right hand scale; open triangles and open circles) increases from 1 dB by decreasing the span loss from 25 to 16 dB, which is a very low figure as compared to an EDFA, for which the increase in noise figure is typically higher than 5 dB.

Figure 5:
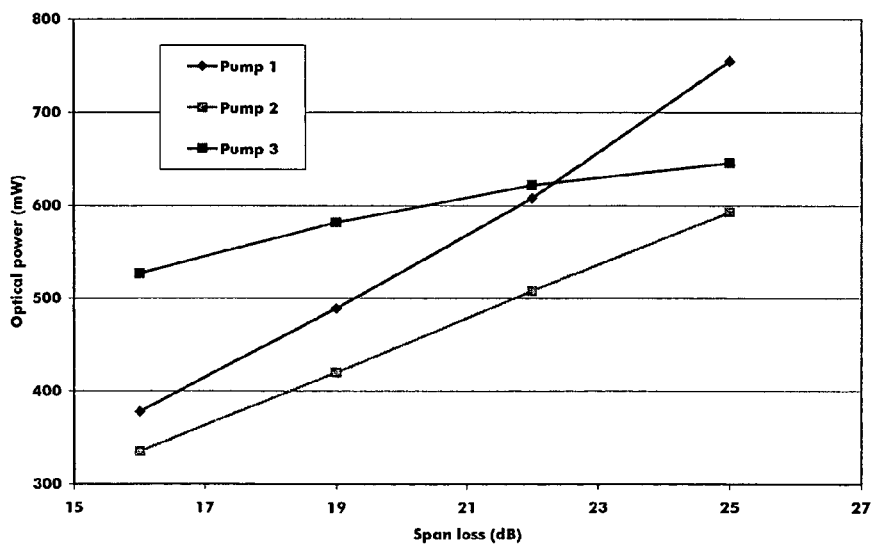
FIG. 5 shows in a fourth diagram the optical pump power of the three pump wavelengths of the pumps in the first amplifier stage as a function of the span loss.

FIG. 5 shows the pump powers of the first stage at the three pump wavelength versus span loss. For 1 dB span loss variation, the variation of the optical power of the lower wavelength pump and the middle wavelength pump (denoted pump 1 and pump 2 in the graph, respectively) is around 10%. The higher wavelength pump (denoted pump 3) power varies only by a few percents.

While a preferred embodiment of the invention has been explained, the invention is not restricted to the exemplary details given there. Conversely, there are many alternatives and modifications available. For example, the control unit can be a single unit such as a central computer or can be distributed over several control devices. It can be a hard-wired control unit or a software-driven processing unit.

Rather than measuring the input and output signal power, other alternatives to determine the on/off gain value may be used such as look-up tables with predetermined values for gain per pump power. Secondary parameters of the amplifier could also be used to determine the gain. Instead of monitoring the input power, only the output power could be monitored to adjust the gain values.

The Raman amplifier of the preferred embodiment is a lumped amplifier, which means that the amplifying fiber is not deployed. Alternatively, the amplifier could be a distributed amplifier that uses for one or for both amplifier stages the preceding and/or the subsequent fiber link as amplifying medium. The invention is also not restricted to only two stages but can have multiple stages, provided that at least two stages are controlled separately according to the principles explained above. In order to achieve good gain stability, the stability and control of the pump wavelengths should preferably be better than 5% to 10%. The control adjusts the pump power of the individual pump wavelengths but could in addition also adjust the wavelength values.

Many different fiber types could be used, provided that they show at least some Raman efficiency. In a preferred improvement of the present invention, the fiber of both amplifier stages is a Dispersion Compensative Fiber (DCF), i.e., a fiber with a negative chromatic dispersion, which allows to compensate for, at least, a part of link fiber dispersion that distorts the data signal.

The invention claimed is:

1. An optical amplifier comprising
   a first amplifier stage comprising a first gain medium and a first pump light source coupled to said first gain medium to launch a pump light signal therein for amplifying an optical signal traversing said first medium by stimulated Raman scattering;
   a second amplifier stage comprising a second gain medium and a second pump light source coupled to said second gain medium to launch a pump light signal therein for amplifying the optical signal traversing said second medium by stimulated Raman scattering; and
   a control unit for monitoring the optical signal and for adjusting a pump power of the first pump light source to varying input signal attenuation and for adjusting a pump power of the second pump light source to a changing number of wavelength channels in the optical signal.

2. An amplifier according to claim 1, wherein a dispersion compensating module is connected between said first and second pump stages.

3. An amplifier according to claim 1, wherein the pump power of the first pump light source is adjusted to be substantially higher than the pump power of the second pump light source.

4. An amplifier according to claim 1, wherein the pump power of the first pump light source is adjusted to achieve a maximum signal power of about −7 dBm per channel at the output of the first stage and the pump power of the second pump light source is adjusted to achieve a signal power value in the range of 1 dBm per channel at the output of the amplifier.

5. An amplifier according to claim 1, wherein said first and second gain media are Raman efficient optical fibers.

6. An amplifier according to claim 1, wherein at least one of said first and second gain media is a dispersion compensating fiber.

7. An amplifier according to claim 1, wherein at least one of said first and second pump light sources contains a number of laser diodes emitting at different wavelengths and a wavelength multiplexer for launching the pump light into the corresponding gain medium.

8. An amplifier according to claim 1, wherein the control means is designed to maintain the pump power of the second pump light source in the event of varying input signal attenuation and to maintain the pump power of the first pump light source unchanged in the event of changing number of wavelength channels in the optical signal.

9. An amplifier according to claim 1, wherein the amplifier contains a first photodiode connected via a first tap coupler to the input of the amplifier for monitoring the power of the optical signal, a second photodiode connected via a second tap coupler to the output of the first amplifier stage for monitoring the power of the optical signal after the fist stage and a third photodiode connected via a third tap coupler to the output of the amplifier for monitoring the power of the output optical signal; wherein all three photodiodes are connected to a control unit for adjusting the pump power of said pump light sources.

10. An amplifier according to claim 1, comprising an input for a supervisory signal providing information about changing channel loading in the input optical signal.

11. A method of controlling the gain of a Raman amplifier, said method comprising the steps of
    launching a pump light signal into a first gain medium of a first amplifier stage of said Raman amplifier for amplifying an optical signal traversing said first medium by stimulated Raman scattering;
    launching a pump light signal into a second gain medium of a second amplifier stage of said Raman amplifier for amplifying the optical signal traversing said second medium by stimulated Raman scattering;
    monitoring the optical signal;
    adjusting a pump power of the first pump light source to varying input signal attenuation; and
    adjusting a pump power of the second pump light source to a changing number of wavelength channels in the optical signal.

* * * * *